D. H. SUMNER.
Measuring Can.
No. 68,913.
Patented Sept. 17, 1867.
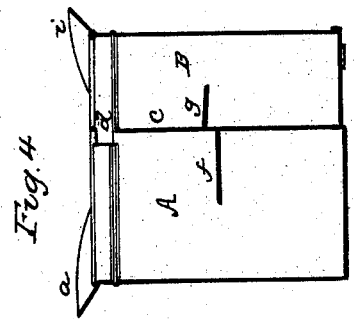
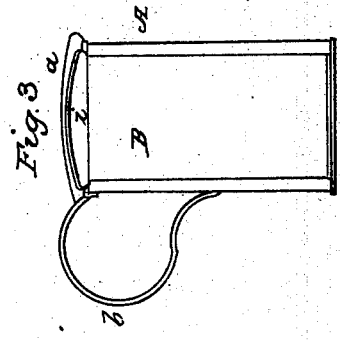
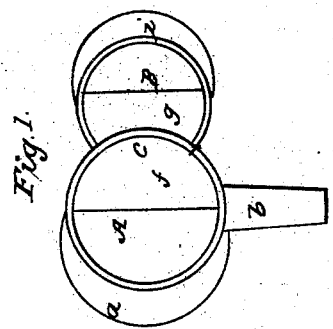
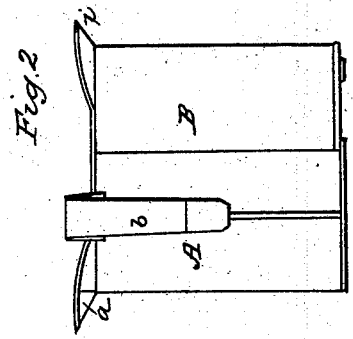

United States Patent Office.

DAVID H. SUMNER, OF SOUTH BOSTON, MASSACHUSETTS.

Letters Patent No. 68,913, dated September 17, 1867.

---

IMPROVED MEASURING-CAN.

---

The Schedule referred to in these Letters Patent and making part of the same.

---

TO ALL PERSONS TO WHOM THESE PRESENTS MAY COME:

Be it known that I, DAVID H. SUMNER, of South Boston, of the county of Suffolk, and State of Massachusetts, have invented a new and useful or improved Measuring-Can; and I do hereby declare the the same to be fully described in the following specification, and represented in the accompanying drawings, of which—

Figure 1 is a top view,

Figure 2 a side elevation,

Figure 3 an end elevation, and

Figure 4 a longitudinal section of it.

In such drawings, A denotes a cylindrical vessel, open at top, and there provided with a nose or discharging spout, $a$. It also has a handle, $b$, applied to its side. Against such vessel A another vessel, B, having a spout, $i$, is affixed, so that a portion, $e$, of the vessel A may constitute a partition by which the internal spaces of the two vessels are separated from each other. In the upper part of such portion $e$ is a horizontal hole or passage, $d$, whose lower edge is to be arranged at the height indicative of the exact measure of a given quantity of liquid, a quart for instance, when in the vessel A, the vessel B being formed to contain a given fractional part of such liquid when standing within it up to the level of the orifice $d$. This fractional part may be a pint, for instance. Within the two vessels A B, and at about one-half the altitude of each, I arrange two partitions, $f$ and $g$, one being in each vessel, and in manner as shown in the drawings.

Under this condition of things if a liquid be poured or suffered to run into the vessel A it will rise therein up to the level of the bottom of the orifice $d$, and any surplus above a quart will flow through the orifice into the vessel B; thus a quart will be measured off with certainty and dispatch, and without any particular attention from the party who may be supplying the liquid to the vessel A. On turning down the vessel A for the purpose of decanting the liquid by means of the spout $a$, the surplus liquid within the vessel B will be prevented by the partition in such vessel from passing into the vessel A. So, when it may be desirable to measure by the vessel B one has only to run the liquid into such vessel until it may reach and flow through the orifice $d$, and into the vessel A. On turning the two vessels down so as to discharge the contents of the smaller by its spout, any surplus liquid within the larger will be prevented by the partition of such vessel from flowing into the vessel B.

The convenience to milkmen, liquor dealers, and others, of the measuring-can, made as described, must be apparent to most if not all persons.

What I claim as my invention is—

The duplex measuring-can, composed of the two vessels A B, the orifice $d$, and the partitions $f\ g$, arranged substantially as described, such can being provided with discharging spouts and a handle, as set forth, when such may be essential or necessary thereto.

DAVID H. SUMNER.

Witnesses:
R. H. EDDY,
F. P. HALE, Jr.